US012027785B2

(12) United States Patent
Sazegar et al.

(10) Patent No.: US 12,027,785 B2
(45) Date of Patent: *Jul. 2, 2024

(54) BROAD TUNABLE BANDWIDTH RADIAL LINE SLOT ANTENNA

(71) Applicant: Kymeta Corporation, Redmond, WA (US)

(72) Inventors: Mohsen Sazegar, Kirkland, WA (US); Ibrahim Nassar, Redmond, WA (US)

(73) Assignee: KYMETA CORPORATION, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,200

(22) Filed: Sep. 27, 2022

(65) Prior Publication Data

US 2023/0118519 A1 Apr. 20, 2023

Related U.S. Application Data

(63) Continuation of application No. 16/950,683, filed on Nov. 17, 2020, now Pat. No. 11,489,258, which is a (Continued)

(51) Int. Cl.

*H01Q 5/40* (2015.01)
*H01Q 1/28* (2006.01)

(Continued)

(52) U.S. Cl.

CPC ............... *H01Q 5/40* (2015.01); *H01Q 1/288* (2013.01); *H01Q 1/523* (2013.01); *H01Q 3/40* (2013.01);

(Continued)

(58) Field of Classification Search

CPC .......... H01Q 5/40; H01Q 1/288; H01Q 1/523; H01Q 3/40; H01Q 15/0086;

(Continued)

(56) References Cited

U.S. PATENT DOCUMENTS 3,714,608 A 1/1973 Barnes et al.
4,291,312 A 9/1981 Kaloi (Continued)

FOREIGN PATENT DOCUMENTS

CN 103222109 A 7/2013
JP 60-199201 A 10/1985

(Continued)

OTHER PUBLICATIONS

A. Sihvola, "Electromagnetic emergence in metamaterials," in Advances in Electromagnetics of Complex Media and Vletamaterials, S.Zouhdi, A.Sihvola, and M.Arsalane, eds., vol. 89 of NATO Science Series II: Mathematics, Physics, Physics, and Chemistry (Kluwer Academic, 2003), pp. 3-17. (Year: 2003).

(Continued)

*Primary Examiner* — Alexander H Taningco

(74) *Attorney, Agent, or Firm* — Womble Bond Dickinson (US) LLP

(57) ABSTRACT

Antennas and methods for using the same are described. In one embodiment, the antenna comprises an aperture having a plurality of radio-frequency (RF) radiating antenna elements, the plurality of RF radiating antenna elements being grouped into three or more sets of RF radiating antenna elements, with each set being separately controlled to generate a beam at a frequency band in a first mode.

20 Claims, 12 Drawing Sheets

Related U.S. Application Data continuation of application No. 16/247,398, filed on Jan. 14, 2019, now Pat. No. 10,892,553.

(60) Provisional application No. 62/618,493, filed on Jan. 17, 2018.

(51) Int. Cl.

| | |
|---|---|
| ***H01Q 1/52*** | (2006.01) |
| ***H01Q 3/40*** | (2006.01) |
| ***H01Q 15/00*** | (2006.01) |
| ***H01Q 21/00*** | (2006.01) |
| ***H01Q 21/06*** | (2006.01) |
| ***H01Q 21/20*** | (2006.01) |
| ***H01Q 21/28*** | (2006.01) |
| ***H01Q 21/29*** | (2006.01) |
| ***H01Q 25/00*** | (2006.01) |
| *H01Q 21/24* | (2006.01) |

(52) U.S. Cl.

CPC ..... *H01Q 15/0086* (2013.01); *H01Q 21/0031* (2013.01); *H01Q 21/064* (2013.01); *H01Q 21/20* (2013.01); *H01Q 21/28* (2013.01); *H01Q 21/29* (2013.01); *H01Q 25/00* (2013.01); *H01Q 21/24* (2013.01)

(58) Field of Classification Search

CPC .. H01Q 21/0031; H01Q 21/064; H01Q 21/20; H01Q 21/28; H01Q 21/29; H01Q 25/00; H01Q 21/24; H01Q 3/44; H01Q 5/42; H01Q 3/24; H01Q 5/22

See application file for complete search history.

(56) References Cited

U.S. PATENT DOCUMENTS

| | | | | |
|---|---|---|---|---|
| 4,489,325 | A | 12/1984 | Bauck et al. | |
| 4,819,003 | A | 4/1989 | Goto et al. | |
| 4,920,350 | A | 4/1990 | McGuire et al. | |
| 4,978,934 | A | 12/1990 | Saad | |
| 5,049,895 | A | 9/1991 | Ito et al. | |
| 5,512,906 | A | 4/1996 | Speciale | |
| 5,661,498 | A | 8/1997 | Goto et al. | |
| 6,061,023 | A | 5/2000 | Daniel et al. | |
| 6,075,483 | A | 6/2000 | Gross | |
| 6,211,823 | B1 | 4/2001 | Herring | |
| 6,396,440 | B1 | 5/2002 | Chen | |
| 6,512,906 | B2 | 1/2003 | Gack | |
| 6,552,696 | B1 | 4/2003 | Sievenpiper et al. | |
| 6,597,312 | B1 | 7/2003 | Hrycak | |
| 6,664,867 | B1 | 12/2003 | Chen | |
| 6,674,408 | B1 | 1/2004 | Chen | |
| 6,791,497 | B2 | 9/2004 | Winebrand et al. | |
| 7,307,596 | B1 | 12/2007 | West | |
| 7,466,269 | B2 | 12/2008 | Haziza | |
| 7,808,443 | B2 | 10/2010 | Lindmark et al. | |
| 7,889,127 | B2 | 2/2011 | Sajuyigbe et al. | |
| 8,604,989 | B1 * | 12/2013 | Olsen | H01Q 3/40 343/754 |
| 9,385,435 | B2 | 7/2016 | Bily et al. | |
| 9,450,310 | B2 | 9/2016 | Bily et al. | |
| 9,806,425 | B2 | 10/2017 | Apostolos et al. | |
| 9,887,456 | B2 | 2/2018 | Bily et al. | |
| 9,893,435 | B2 | 2/2018 | Bily et al. | |
| 9,905,921 | B2 * | 2/2018 | Sazegar | H01Q 21/061 |
| 10,128,931 | B2 | 11/2018 | Rothaar et al. | |
| 10,811,784 | B2 | 10/2020 | Sikes et al. | |
| 2002/0039083 | A1 | 4/2002 | Taylor et al. | |
| 2002/0122009 | A1 | 9/2002 | Winebrand et al. | |
| 2004/0227668 | A1 | 11/2004 | Sievenpiper | |
| 2005/0110683 | A1 | 5/2005 | Song et al. | |
| 2007/0200781 | A1 | 8/2007 | Ahn et al. | |
| 2008/0180339 | A1 | 7/2008 | Yagi | |
| 2008/0224707 | A1 | 9/2008 | Wisler et al. | |
| 2009/0174499 | A1 | 7/2009 | Hiramatsu et al. | |
| 2009/0251385 | A1 | 10/2009 | Xu et al. | |
| 2009/0322618 | A1 | 12/2009 | Shoji | |
| 2010/0060534 | A1 | 3/2010 | Oodachi | |
| 2010/0156573 | A1 | 6/2010 | Smith et al. | |
| 2011/0074630 | A1 | 3/2011 | Snow | |
| 2012/0194399 | A1 | 8/2012 | Bily et al. | |
| 2013/0207859 | A1 | 8/2013 | Legay et al. | |
| 2014/0009357 | A1 | 1/2014 | Tiezzi et al. | |
| 2014/0266946 | A1 | 9/2014 | Bily et al. | |
| 2015/0028803 | A1 | 1/2015 | Shevde et al. | |
| 2016/0233588 | A1 | 8/2016 | Bily et al. | |
| 2016/0261042 | A1 | 9/2016 | Sazegar et al. | |
| 2016/0365647 | A1 | 12/2016 | Du et al. | |
| 2017/0195018 | A1 | 7/2017 | Ma et al. | |
| 2017/0256865 | A1 | 9/2017 | Sikes et al. | |
| 2017/0294715 | A1 | 10/2017 | Wu et al. | |
| 2018/0115063 | A1 | 4/2018 | Sazegar et al. | |

FOREIGN PATENT DOCUMENTS

| | | | |
|---|---|---|---|
| JP | 02-164108 | A | 6/1990 |
| JP | 08-008640 | A | 1/1996 |
| JP | 3247155 | B2 | 1/2002 |
| JP | 2003-008341 | A | 1/2003 |
| JP | 2008-507238 | A | 3/2008 |
| KR | 10-2003-0015214 | | 2/2003 |
| KR | 10-2013-0141527 | A | 12/2013 |
| TW | 201639239 | A | 11/2016 |
| WO | 2004/082073 | A1 | 9/2004 |
| WO | 2006/014795 | A1 | 2/2006 |
| WO | 2012/050614 | A1 | 4/2012 |
| WO | 2013/098795 | A1 | 7/2013 |
| WO | 2016/187701 | A1 | 12/2016 |

OTHER PUBLICATIONS

Ando, M. et al., A Radial Line Slot Antenna for 12 GHz Satellite TV Reception, IRE Transactions on Antennas and Propagation, vol. 33, No. 12, Dec. 1, 1985, pp. 1347-1353.

Awai “Artificial Dielectric Resonators for Miniaturized Filters,” IEEE Microwave Magazine. Oct. 2008. pp. 55-64. Year: 2008).

Chinese Office Action for Application No. 201580003431.6 dated Feb. 24, 2018, 8 pages.

Communication pursuant to Article 94(3) EPC for European Patent Application No. 15751946.3-1205, dated May 9, 2019, 7 pages.

Decision to Grant received for Japanese Patent Application No. 2020-539193, dated Feb. 27, 2023, 5 pages (2 pages of English Translation and 3 pages of Original Document).

European Application No. 15751330.0, Office Action, dated Sep. 6, 2017, 12 pgs.

European Appln. No 15751946.3 Search Report dated Sep. 7, 2017, 13 pages.

European Office Action for Application No. 15751330.0-1205, dated Mar. 7, 2019, 7 pages.

European Search Report and Search Opinion received for European Application No. 19740944.4, dated Sep. 13, 2021, 10 pages.

First Office Action CN, US Application No. 201580003442.4, dated Feb. 24, 2018, 9 pgs.

Gomez-Tornero, J. et al. “Holographic Surface Leaky-Wave Lenses With Circularly-Polarized Focused Near-Fields—Part I: Concept, Design and Analysis Theory.” IEEE Transactions on Antennas and Propogation, vol. 61, No. 7, Jul. 2013. pp. 3475-3485. (Year: 2013).

Indian Office Action for Application No. 201647024685 dated Feb. 26, 2019, 11 pages.

Indian Office Action for Application No. 201647024686 dated Mar. 14, 2019.

International Preliminary Report on Patentability on Application No. PCT/US2019/013854 dated Jul. 10, 2020, 12 pages.

International Preliminary Report on Patentability received for PCT Patent Application No. PCT/US2015/012077, dated Sep. 1, 2016, 10 pages.

(56) References Cited

OTHER PUBLICATIONS

International Search Report and Written Opinion received for PCT Patent Application No. PCT/US2015/012077, dated Apr. 24, 2015, 8 pages.
International Search Report and Written Opinion received for PCT Patent Application No. PCT/US2019/013854, dated May 8, 2019, 15 pages.
Japanese Application No. 2016-553295, Office Action dated Aug. 7, 2017, 16 pgs.
Japanese Office Action for Application No. 2016-553419 dated Mar. 12, 2018, 6 pages.
Korean Application No. 10-2016-7016043, Office Action, dated Jul. 20, 2017, 21 pgs.
Korean Application No. 10-2016-7016044, Office Action, dated Apr. 20, 2017, 14 pgs.
Korean Office Action for Application No. 10-2016-7016043 dated Jan. 22, 2018, 27 pages.
Loecker, C. "Metamaterial Enhanced Phased-Array Antenna." 978-1-4673-5707-4/13 (c) 2013 IEEE. pp. 1119-1122. (Year:2013).
Manasson, V. et al "Electronically Reconfigurable Aperture (ERA): A New Approach for Beam-Steering Technology." IEEE 2010. pp. 673-679. (Year: 2010).
Marin, Radu, "Investigations on Liquid Crystal Reconfigureable Unit Cells for MMWave Reflectarrays," Jan. 1, 2008, pp. i-155, XP055401196; URL:http://tuprints.ulb.tu-damstadt.de/1089/1/disss_Radu_Marin_WebPubl.pdf.
Notice of Reasons for Refusal received for Japanese Patent Application No. 2020-539193, dated Jul. 27, 2022, 10 pages (5 pages of English Translation and 5 pages of Original Document).
Notification Concerning Transmittal of International Preliminary Report on Patentability issued for International Patent Application No. PCT/US2015/013099, dated Sep. 1, 2016.
Office Action received for European Application No. 19740944.4, dated Mar. 14, 2023, 9 pages.
Office Action received for European Patent Application No. 15751330.0, dated Jul. 23, 2018, 8 pages.
Office Action received for European Patent Application No. 15751946.3, dated Jul. 5, 2018, 10 pagers.
Ovi, et al. "Symmetrical Slot Loading in Eliptical Microstrip Patch Antennas Partially Filled with Mue Negative Metamaterials," PIERS Proceedings, Moscow, Russia, Aug. 19-23, 2012, pp. 542-545.
P.K. Varlamos, et al., "Electronic Beam Steering Using Switched Parasitic Smart Antenna Arrays," Progress in Electromagnetics Research, PIER 36, 2002, pp. 101-119.
PCT Appln. No. PCT/2015/013099 International Search Report and Written Opinion, dated Apr. 24, 2015, 9 pgs.
Request for the Submission of an Opinion received for Korean Patent Application No. 10-2020-7022991, dated Jun. 20, 2022, 13 pages (7 pages of English Translation and 6 pages of Original Document).
Second Chinese Office Action dated Oct. 16, 2018, (9 pages).
Symeonidou, A. "A Novel Microstrip Antenna Array With Metamaterial-Based Electronic Beam Steering at 2.4 GHz." Progress in Electromagnetics Research C, vol. 38, 27-42, 2013 (Year: 2013).
Taiwan Application No. 104103553, Office Action dated Oct. 24, 2017, 11 pgs.
Taiwanese Office Action and Search Report on the Patentability of Application No. 108101697 dated Mar. 15, 2022,9 pages.
Taiwanese Office Action for Application No. 104103553 dated Oct. 12, 2018.
Written Decision on Registration received for Korean Patent Application No. 10-2020-7022991, dated Dec. 7, 2022, 5 pages (3 pages of English Translation and 2 pages of Original Document).
Taiwanese Search Report for Taiwanese Patent Application No. 111144728, dated Aug. 9, 2023, 5 pages.
Notice of Allowance for Korean Patent Application No. 10-2023-7004396, dated Oct. 17, 2023, 4 pages.
Notice of Allowance received in related Taiwan Application No. 111144728, mailed Mar. 21, 2024, 3 pages.
Office Action received in related Japanese Application No. 2023-052597, mailed Apr. 4, 2024, 4 pages.

* cited by examiner

RX Single Band Operation

RX Combined Band Operation

RX Multi Band Operation

Iris L2

Iris L1

Patch and Iris L1

Top View

BROAD TUNABLE BANDWIDTH RADIAL LINE SLOT ANTENNA

PRIORITY

The present patent application is a continuation of and claims the benefit of U.S. patent application Ser. No. 16/950,683, filed on Nov. 17, 2020, entitled "Broad Tunable Bandwidth Radial Line Slot Antenna", which is a continuation of U.S. patent application Ser. No. 16/247,398, filed on Jan. 14, 2019, entitled "Broad Tunable Bandwidth Radial Line Slot Antenna," which claims priority to the corresponding provisional patent application Ser. No. 62,618,493, filed on Jan. 17, 2018, entitled, "BROAD TUNABLE BANDWIDTH RADIAL LINE SLOT ANTENNA," both of which are incorporated by reference in their entirety.

FIELD OF THE INVENTION

Embodiments of the present invention relate to the field of antennas for wireless communication; more particularly, embodiments of the present invention relate to radial line slot antennas having broad tunable bandwidth due through the use of multiple sets of slots, each separately and simultaneously controlled for a specific frequency band.

BACKGROUND OF THE INVENTION

Radial line slot antennas are well-known in the art. Examples of radial line slot antenna include those described in Ando et al., "Radial line slot antenna for 12 GHz DBS satellite reception", and Yuan et al., "Design and Experiments of a Novel Radial Line Slot Antenna for High-Power Microwave Applications". The antennas described in the papers include a number of fixed slots that are excited by a signal received from a feed structure. The slots are typically oriented in orthogonal pairs, giving a fixed circular polarization on transmit and the opposite in receive mode.

Another example of an antenna is described in U.S. Pat. No. 9,893,435, entitled "Combined antenna apertures allowing simultaneous multiple antenna functionality," which describes embodiments that include a single physical antenna aperture having two spatially interleaved antenna sub-arrays of antenna elements. Embodiments of antennas include sub-arrays of antenna elements that include slots for transmit and receive using radio-frequency holography on the same antenna aperture. Each antenna sub-array can be operated independently and simultaneously at a specific frequency.

Holographic antennas have been developed that have an advantageous form factor over conventional form factors for satellite antennas. Increasing the performance of holographic antennas increases the uses and viability of holographic antennas in certain use-cases.

SUMMARY OF THE INVENTION

Antennas and methods for using the same are described. In one embodiment, the antenna comprises an aperture having a plurality of radio-frequency (RF) radiating antenna elements, the plurality of RF radiating antenna elements being grouped into three or more sets of RF radiating antenna elements, with each set being separately controlled to generate a beam at a frequency band in a first mode.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
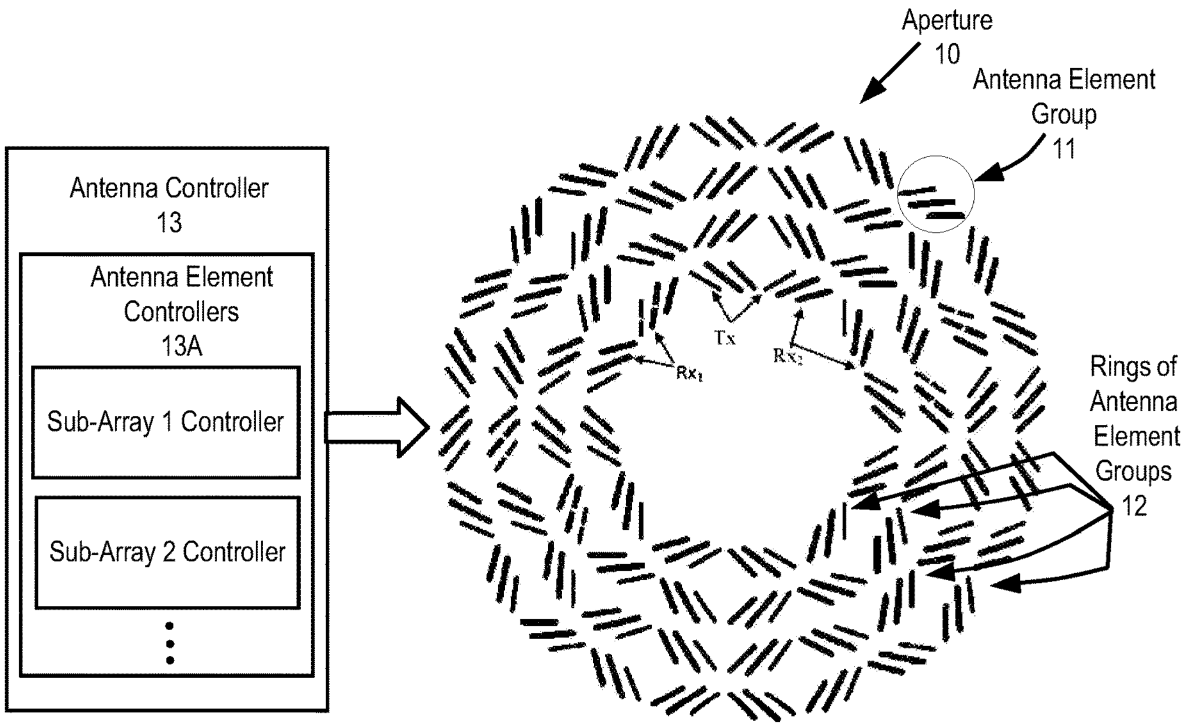
FIG. 1 illustrates one embodiment of a layout of antenna elements for a satellite antenna aperture.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the invention include techniques for extending the dynamic bandwidth of a tunable beam steering antenna. A beam steering antenna and methods for operating the same are also described. In one embodiment, the antenna comprises a high-density aperture loaded with electrically small radio-frequency (RF) radiating elements. In one embodiment, the RF radiating elements are electrically small slots with varying sizes loaded with liquid crystal (LC) material to tune the operating frequency while achieving nearly constant radiation characteristics across a tuning range. In one embodiment, these elements with varying sizes are controlled independently using LC tuning components to cover three or more frequency bands.

Embodiments of the invention described herein decouple the dynamic bandwidth of the antenna from the tuning range of the LC. This provides more freedom to extend the dynamic bandwidth without increasing the tunability of LC. This is in contrast to prior art antennas where the dynamic bandwidth of the antenna is directly determined with the tuning range of LC, and an increase in LC's tunability or the tunability of a radiation element results in significant loss and reduced the antenna gain.

In one embodiment, the RF radiating elements are grouped into a number of groups, with each group controlled separately and independently of the other groups. Each group is assigned to a frequency band and generates a beam at that frequency band. In one embodiment, the frequency bands include one or more receive bands and one or more transmit bands. In one embodiment, the receive band is divided into two or more sub-bands, where each sub-band can be operated separately and each can be combined with the transmit band. Thus, the antenna elements for each receive sub-band can operate at the same time as the antenna elements for the transmit band. Splitting the frequency bands improves the efficiency in comparison to an approach of using a single element to cover a wide tuning range. In one embodiment, to operate the antenna, a controller uses different control algorithms to control the radiation characteristics so that antenna elements for each of the receive bands and each of the transmit bands are controlled separately.

In one embodiment, the RF radiating and tuning elements are placed in a manner that reduces the mutual coupling and improves the radiation performance. In other words, the elements are placed to isolate them from each other to reduce the amount of mutual coupling that can occur between the antenna elements. In one embodiment, antenna elements for different sets of antenna elements associated with different frequency bands are grouped together in element groups and these element groups are placed or otherwise located in the antenna aperture. The mutual coupling is between individual elements within the element group and the coupling between the different groups of elements. For example, in one embodiment, the antenna aperture includes three sets of RF radiating antenna elements for generating beams for three bands, and RF radiating antenna elements for the three bands are placed in a way that reduces mutual coupling between elements in the element groups and between element groups themselves, while maintaining high radiation performance. In one embodiment, one RF radiating element from the elements for each of the three frequency bands are grouped together in groups and these three radiating elements are placed next to, and in parallel, with each other. In one embodiment, a similar placement is used when arranging antenna elements for four or more bands.

In one embodiment, the antenna aperture is modulated with different schemes to achieve high gain performance and maintain high isolation between the receive and transmit bands. In one embodiment, the antenna aperture is capable to generate multiple beams that can be independently controlled.

One of the benefits of one embodiment of the antenna aperture is to expand the operating bandwidth of the antenna aperture and to maintain high radiation characteristics without increasing the size of the aperture. The LC material has a limited tuning range which limits the antenna operating bandwidth. In one embodiment, the LC enables the aperture to cover the entire transmit (Tx) band but not the entire receive (Rx) band, which in one embodiment is approximately 2 GHz. For example, the LC can cover about 1 GHz of the 2 GHz Rx band. To overcome this limitation, an additional set of radiating receive elements is added to a first set of radiating elements that covers a portion of the receive band. This additional set of radiating received elements has a physical size that is different from the receive elements of the first set and is added to have an operating bandwidth adjacent to the first set of receive elements. Using this approach, the tuning range is improved from 1 GHz to 2 GHz without degrading the radiation characteristics of the first band. In one embodiment, the elements that generate beams for the two receive bands and the elements that generate a beam for the transmit band are placed in a way that reduces mutual coupling and maintains a high radiation efficiency over the entire frequency range. In one embodiment, the antenna can operate in a single or multiple bands modes that can be controlled using the tunable LC material. That is, the antenna can use sets of antenna elements for different bands by controlling the tunable LC material in the antenna element, such as when there are two sets of receive elements used to cover a larger tuning range in a multi-band mode, or use sets of antenna elements in a combined fashion so that they both cover the same operation frequency as in a single band mode. The freedom to operate in a single band mode or multi-band mode can be exploited to create a multi-beam antenna.

Thus, one purpose of embodiments of the invention is to achieve a broader dynamic bandwidth for a given cylindrical aperture antenna size without degrading the radiation characteristics and to be able to generate multiple receive beams with independent control. This provides significant benefits to satellite communication comprising LEO, MEO, or GEO constellations where a "make-before-break" concept is needed so that a connection to the satellite constellation can be maintained. In one embodiment, with a multi beam antenna, one of the beams can point to the next emerging satellite before the other satellite connection is lost. That way a continuation of the receive band can be maintained.

Embodiments of the present invention have one or more of the following advantages: 1) have a wider turning range of 2 GHz and nearly constant radiation characteristics across the tuning range for the same aperture size; and 2) have more freedom in controlling beam direction when operating in a multi-beam mode.

FIG. 1 illustrates one embodiment of a layout of RF radiating antenna elements for a satellite antenna aperture. Referring to FIG. 1, aperture 10 includes three sets of RF radiating antenna elements, with each set for a different band. In one embodiment, each of the RF radiating elements comprises a patch/slot pair, such as described in more detail below. In one embodiment, a first of the three sets of antenna elements is for generating a receive beam at a first frequency, a second of the three sets of antenna elements is for generating a receive beam at a second frequency (different than the first frequency) and the third of the three sets of antenna elements is for generating a transmit beam at a third frequency (different than the first and second frequencies). In a combined mode of operation multiple groups can be operated at the same frequency.

In one embodiment, one antenna element from each set of antenna elements is grouped and placed together in rings. For example, antenna element group 11 includes three elements, and each element in each group of antenna elements (e.g., antenna element group 11) is for covering a different band. Note that in alternative embodiments, element groups include 4 or more elements (e.g., two transmit elements and two receive elements, three receive elements and one or more transmit elements, etc.).

In one embodiment, one element in each group of elements (e.g., antenna element group 11) is for a first receive band, one element in each group of elements (e.g., antenna element group 11) is for a second receive band, and one element in each group of elements (e.g., antenna element group 11) is for a transmit band. The two receive bands includes a low band and a high band (relative to each other in their frequencies). In one embodiment, each low band element (referred to herein as Rx1) is placed in between a high band receive element (referred to herein as Rx2) and a transmit element (Tx).

In one embodiment, the antenna element groups (e.g., antenna element group 11) are placed in rings 12. While four rings are shown in FIG. 1, there are typically many more rings of antenna elements. In other words, the techniques described herein are not limited to use in four rings, and may have any number of rings (e.g., 5, 6, . . . , 10, 20, . . . 100, etc.). Furthermore, while rings are depicted in FIG. 1, the techniques described herein are not limited to using rings and other placements of the groups may be used (e.g., spirals, grids, etc.). Examples of such placements are shown in U.S. Pat. No. 9,905,921, entitled "Antenna Element Placement for a Cylindrically Fed Antenna."

In one embodiment, the placement is constrained based on the physical space that is available for each set of antenna elements on the aperture with the other sets of elements. In one embodiment, another constraint on the placement of antenna elements is the use of matrix drive to drive the antenna elements, which requires that each of the antenna elements be given a unique address. In one embodiment, by requiring a unique address, column and row lines are used to drive each of the antenna elements, and thus space to accommodate the routing of such lines constrains the placement.

An antenna controller 13 controls the aperture of antenna elements. In one embodiment, antenna controller 13 comprises an antenna element array controller 13A that includes sub-array controller 1, sub-array controller 2, sub-array controller 3, etc., and each of the sub-array controllers 1-N controls one of the sets of antenna elements so that they generate a beam for a particular frequency band. In one embodiment, these controllers include matrix drive control logic to generate drive signals to control the antenna elements. In one embodiment, these controllers control voltages applied to elements to generate a beam (e.g., generate a beam via holographic techniques).

Figure 2:
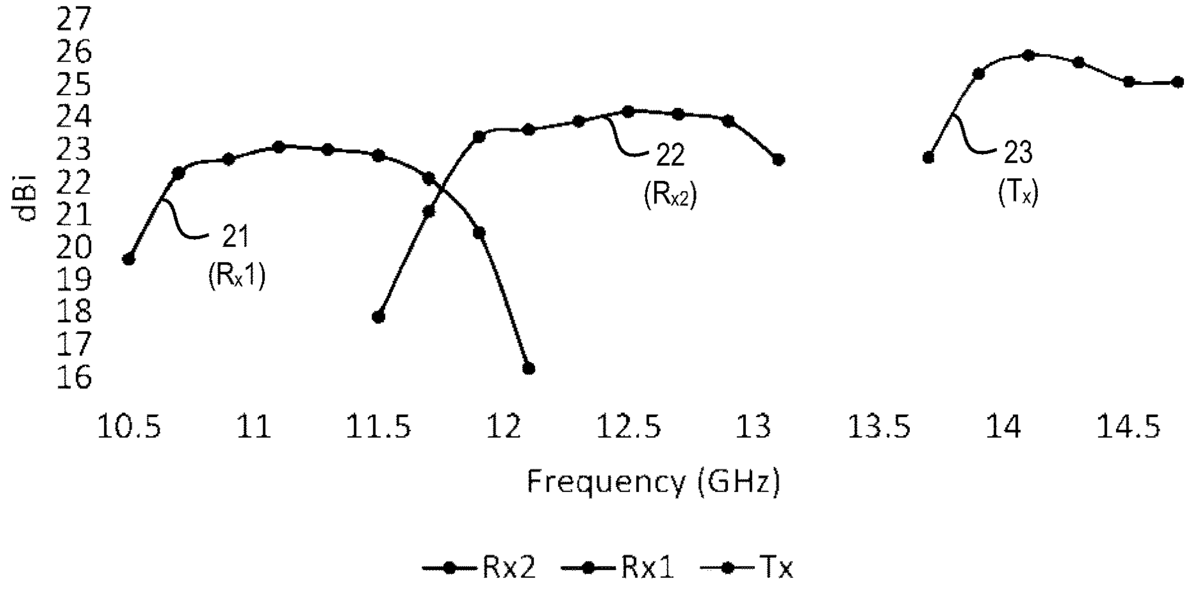
FIG. 2 illustrates dynamic gain bandwidth of one embodiment of a layout of antenna elements for a satellite antenna aperture across the tuning range.

FIG. 2 illustrates an example of dynamic gain bandwidth of one embodiment of a layout of antenna elements for one embodiment of a satellite antenna aperture across a particular tuning range. Referring to FIG. 2, graph 21 illustrates the bandwidth covered by the low receive band (Rx1), graph 22 illustrates the bandwidth covered by the high receive band (Rx2), and graph 23 illustrates the bandwidth covered by the transmit band (Tx).

In one embodiment, the low receive band Rx1 and the high receive band Rx2 overlap each other. Note that such an overlap is not required and the antenna elements for the receive bands may be controlled so that the bands are far apart in other configurations. Furthermore, in embodiments in which there are multiple transmit bands, the transmit bands may or may not overlap depending on their control.

In one embodiment, to obtain a high gain in the overlap region of the receive bands both adjacent bands are used in a combined mode. That provides a higher efficiency than using any of the sub-bands in a single mode of operation.

Figure 3:
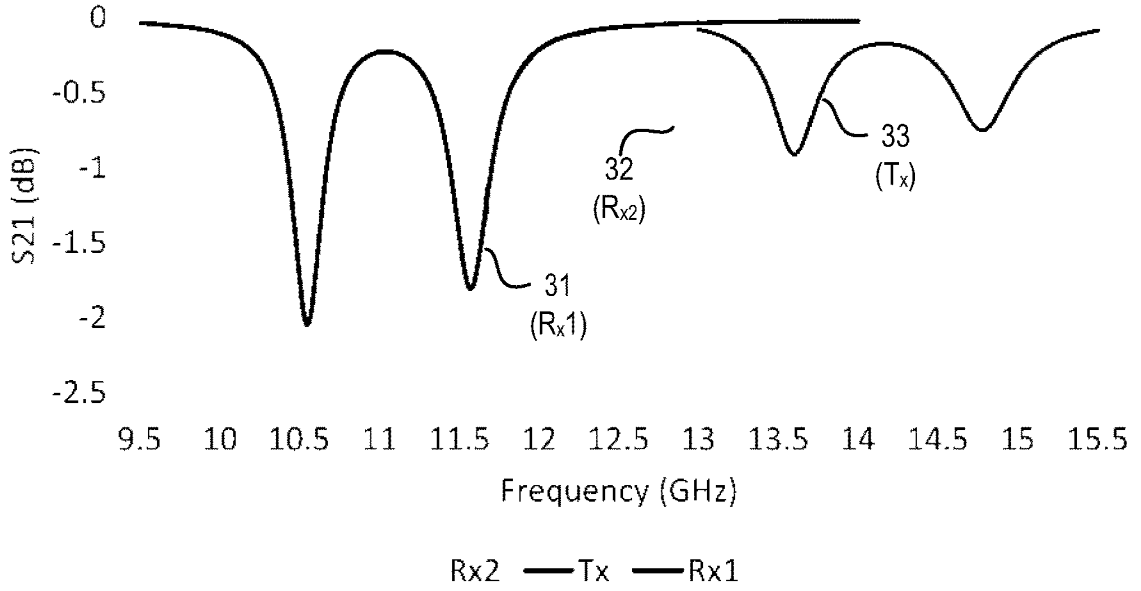
FIG. 3 illustrates an example of performance for an embodiment with slots for three frequency bands.

FIG. 3 illustrates an example of the S21 magnitude for a single antenna aperture having the three set of elements, each for a different frequency band. Referring to FIG. 3, graph 31 represents the performance for the low receive band Rx1, graph 32 represents the performance for the low receive band Rx2, and graph 33 represents the performance for the transmit band Tx.

Note that having one antenna that operates at a wide frequency range is highly valuable and of interest in many applications. In one embodiment, the wide tuning range antenna described herein is used to replace multiple narrow bandwidth antennas, effectively reducing the size, weight, and cost. In one embodiment, the antenna is tuned electrically using LC components loaded on top of the radiating elements, and the operating frequency is varied while keeping the radiation characteristics nearly constant across the tuning range.

In one embodiment, one embodiment of the antenna has 3 separate sets of elements that are tuned independently to operate the antenna at wide frequency range that covers 10.7-12.75 GHz for receiving and 13.7-14.7 GHz for transmitting. This enables having 2 radiation beams for receive (e.g., 2 receive bands) that can be independently controlled.

There are different ways to control the patterns of the antenna with elements laid out and independently controlled. In one embodiment, such as the antenna aperture shown in FIG. 1, the two Rx elements are operated independently and simultaneously to create two beams. In one embodiment, one of the bands is driven to a state to reduce, and potentially minimize, the band interference (mutual coupling). In one embodiment, the two receive bands are also operated together to form one beam with a higher gain. In this case, the energy leaking from the elements interacts constructively to form the one beam.

Figure 4A:
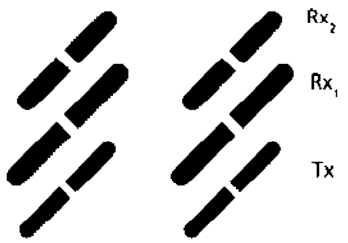
FIGS. 4A-C illustrate embodiments of layouts of a unit cell showing different placement arrangement of the elements.
Figure 4B:
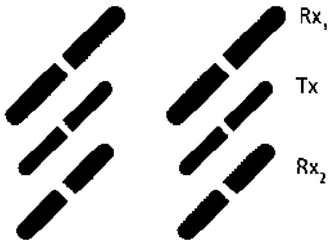
Figure 4C:
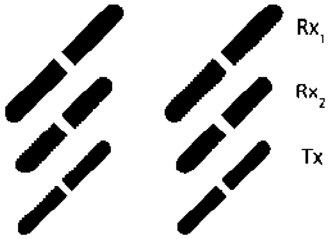
Figure 4D:
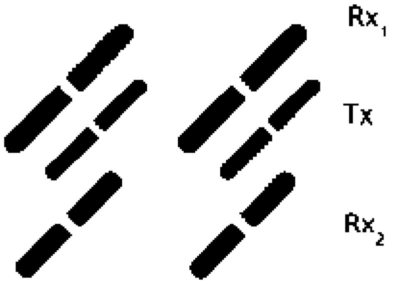
FIGS. 4D-4E illustrate embodiments of layouts of a unit cell using a placement option with shifted transmit (Tx) elements.
Figure 4E:
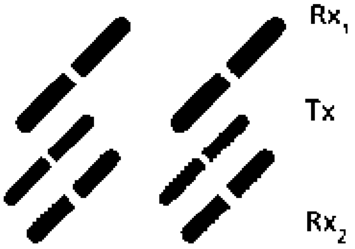

Note that there are a number of alternative embodiments, including those with different placements of antenna elements. FIGS. 4A-C illustrates embodiments of layouts of the unit cell showing the different placement arrangement of the elements (unshifted), and FIGS. 4D and 4E illustrate embodiments of layouts of the unit cell using the second placement option with shifted Tx elements. That is, there are different placement options for the RF radiating antenna elements, including but not limited to:

1) Option 1: The low band elements ($Rx_1$) is in between the high band receive antenna elements ($Rx_2$) and transmit antenna elements (Tx) as illustrated in FIGS. 1 and 4A.

2) Option 2: The transmit elements (Tx) is in the middle of the low band antenna elements ($Rx_1$) and the high band receive antenna elements ($Rx_2$) as shown in FIG. 4B.

3) Option 3: The high band receive antenna elements ($Rx_2$) is in the middle of the transmit antenna elements (Tx) and the low band antenna elements ($Rx_1$) as shown in in FIG. 4C.

4) Shifted Elements: The placement of any of the antenna elements in the top 3 placements option of FIGS. 4A-4C can be shifted to control mutual coupling. As illustrated in FIGS. 4D and 4E, the Tx antenna element can be shifted radially inward or outward of the center.

Note that elements do not have to be evenly spaced with respect to each other. As long as the mutual coupling between elements doesn't cause performance of the antenna to degrade (e.g., radiation efficiency to go down), the elements do not have to be even spaced with respect to each other. In one embodiment, the distance between the elements is freespace wavelength/10 and the width of the elements is freespace wavelength/20.

Referring to FIGS. 4D and 4E, the Tx antenna element is shifted 0.025" upward along the element axis and 0.025" downward, respectively, along the element axis. Note that this offset helps reduce the interband interference. In alternative embodiments, the offset ranges from 0.025" to 0.05". Note that offsets of other sizes are possible and may be used.

Note also that the orientation of elements between adjacent groups helps reduce the coupling. For example, elements that are adjacent to each other while in different groups of elements (e.g., different sets of three elements) that are perpendicular or a similar orientation have less coupling than those having orientations that are similar to each other.

Figure 4F:
FIG. 4F illustrates an embodiment of a layout of a unit cell using a placement option with a rotated antenna element.

In one embodiment, at least one of the elements in the element group (e.g., antenna element group 11) is rotated with respect to the other elements in the group. In this case, the elements are not parallel with respect to each other. FIG. 4F illustrates an example of an arrangement of three elements with one element rotated with respect to at least one of the other two. Because a portion of the rotated element is closer to one or more of the other elements, this increases the chance for mutual coupling. To avoid the increased mutual coupling, the frequency of the rotated element may be selected from a frequency band that is farther away from the frequency bands of any elements that a portion of the rotated element is near. For example, in one embodiment, the Tx antenna element is between two Rx antenna elements (e.g., Rx1 and Rx2); however, mutual coupling is not increased in a way to cause a reduction in antenna efficiency because the operating frequency for the transmit band is far away from the receive bands (e.g., between 13.7-14.7 GHz for transmit and between 10.7-12.75 for receive).

Note that the size of the slots is selected based on the frequency of operations. Thus, based on the band for which the elements generate a beam, the size of an element may change. However, the size is limited by mutual coupling. The larger the element means the greater chance for mutual coupling. Thus, the size of an antenna element is selected based on its impact on mutual coupling with other antenna elements.

In one embodiment, the different sets of antenna elements are controlled so that the antenna elements for one of the receive bands and the transmit band communicates with a satellite while the other receive band is used for acquisition of another satellite. This may occur in a number of applications, including, but not limited so, when an antenna is mobile during communication with a satellite (e.g., attached to moving vehicle or vessel) and the satellite link with the antenna to which the antenna is communicating is going to be lost and a satellite link with another satellite needs to be set up in the near future.

Having multiple sets of antenna elements that may be independently and simultaneously controlled provides a number of additional uses. One of the uses is to enable generating multi-beam antenna with tunable pointing directions. This provides significant benefits to satellite communication comprising LEO, MEO or GEO constellations where a "make-before-break" concept is needed so that a connection to the satellite constellation can be maintained. For example, in one embodiment, with a multi beam antenna, one of the beams can be controlled to point to the next emerging satellite before the other satellite connection is lost. That way a continuation of the receive band can be maintained.

Figure 5A:
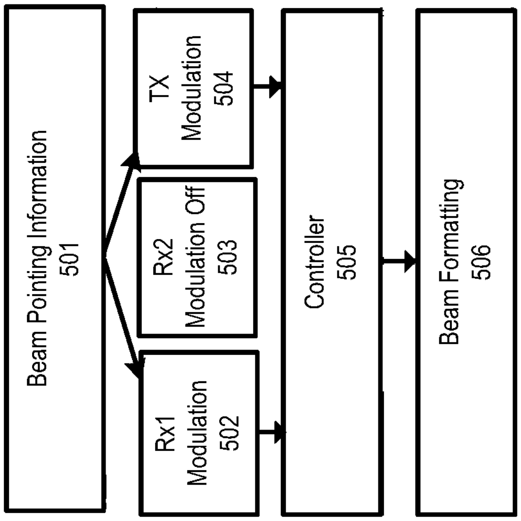
FIGS. 5A-C are flow diagrams of one embodiment of a process for controlling an antenna aperture.
Figure 5B:
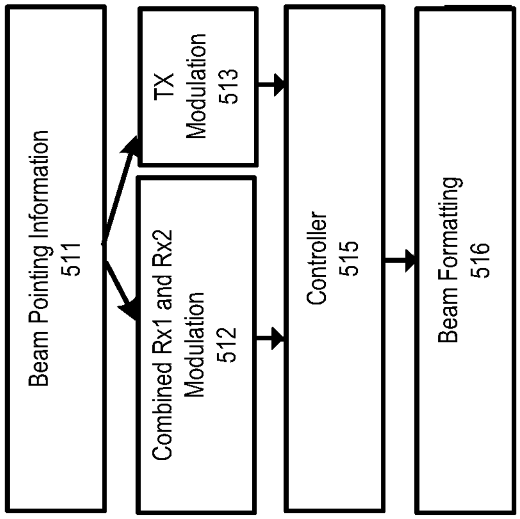
Figure 5C:
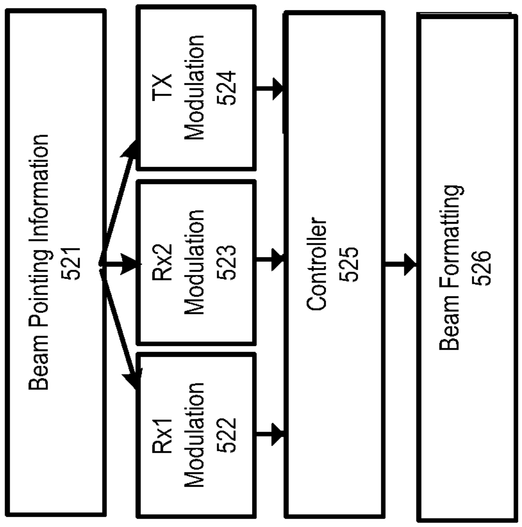

FIGS. 5A-C are flow diagrams of one embodiment of a process for controlling an antenna aperture. In this case, the antenna aperture has two sets of receive antenna elements and one set of transmit antenna elements. Referring to FIG. 5A, when the antenna is operating in receive (Rx) single band mode, the antenna aperture produces a single receive beam using one sets of receive antenna elements and a single transmit beam. In such a case, beam pointing information 501 includes information specifying where the receive beam is to point and information specifying where the transmit beam is to point. This information controls the receive modulation for the first set of receive antenna elements and the transmit modulation for the set of transmit antenna elements, while the modulation for the second set of receive antenna elements is off Rx1 modulation 502 and Tx modulation 503 provide the receive and transmit modulation control signals, respectively, to controller 505, which uses Rx1 modulation 502 and Tx modulation 503 to form a receive beam and a transmit beam using beam forming 506.

Referring to FIG. 5B, when the antenna is operating in receive (Rx) combined band mode, the antenna aperture produces a single receive beam, using both sets of receive antenna elements, and a single transmit beam. In such a case, beam pointing information 511 includes information specifying where the receive beam is to point and information specifying where the transmit beam is to point. This information controls the receive modulation for the first and second sets of receive antenna elements and the transmit modulation for the set of transmit antenna elements. Rx1 modulation 512 and Rx2 modulation 513 provide the receive modulation control signals to controller 515, while Tx modulation 503 provides the transmit modulation control signals to controller 515. Controller 515 uses Rx1 modulation 512 and Rx2 modulation 513 to form a receive beam and Tx modulation 513 to form a transmit beam using beam forming 516.

Referring to FIG. 5C, when the antenna is operating in receive (Rx) multi-beam mode, the antenna aperture produces two receive beams, using both sets of receive antenna elements, and a single transmit beam. In such a case, beam pointing information 511 includes information specifying where the receive beams are to point and information specifying where the transmit beam is to point. This information controls the receive modulation for the first and second sets of receive antenna elements and the transmit modulation for the set of transmit antenna elements. Rx1 modulation 512 and Rx2 modulation 513 provide receive modulation control signals to controller 515, while Tx modulation 503 provides the transmit modulation control signals to controller 515. Controller 515 uses Rx1 modulation 512 and Rx2 modulation 513 to form two receive beams pointing in different directions and Tx modulation 513 to form a transmit beam using beam forming 516.

In one embodiment, a Euclidean modulation scheme is used to control the RF radiating antenna elements, such as described in U.S. patent application Ser. No. 15/881,440 entitled, "Restricted Euclidean Modulation," filed Jan. 26, 2018. In such a schedule, there are a number of available resonant tuning states that may be selected for each set of elements to control their operation in order to generate beam as part of holographic beamforming, which is well-known and is described in more detail below. For example, in one embodiment, each set of RF radiating antenna elements has 16 tuning states is individually controlled with respect to those states.

While in one embodiment, each set can be separately controlled to form its own beam in one mode, two or more of the sets of RF radiating antenna elements are used together to form a single beam in another mode as described in FIG. 5B. In one embodiment, the two or more sets of RF radiating antenna elements are two sets of receive antenna elements that are used together to form a single receive beam. Note that two sets of transmit antenna elements could be used together to form a single transmit beam. In this case, two sets of antenna elements are used to generate a single beam, the available resonant tuning states from the two sets of elements are combined together into one comprehensive Euclidean modulation scheme to form the single beam. For example, when operating receive antenna elements Rx1 and Rx2 of FIGS. 5A-5C, they both have different resonator settings, making them independent from that perspective in that they are tuned to each of their independent states. If both have 16 tuning states, when both of the two receive antenna elements sets are used together, they achieve 32 tuning states. This provides more fidelity to define the single receive beam that is formed. In one embodiment, in another mode, all the elements sets in FIGS. 5A-5C could be operated so that three beams are coming off antenna with all steered at different directions and/or polarizations.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
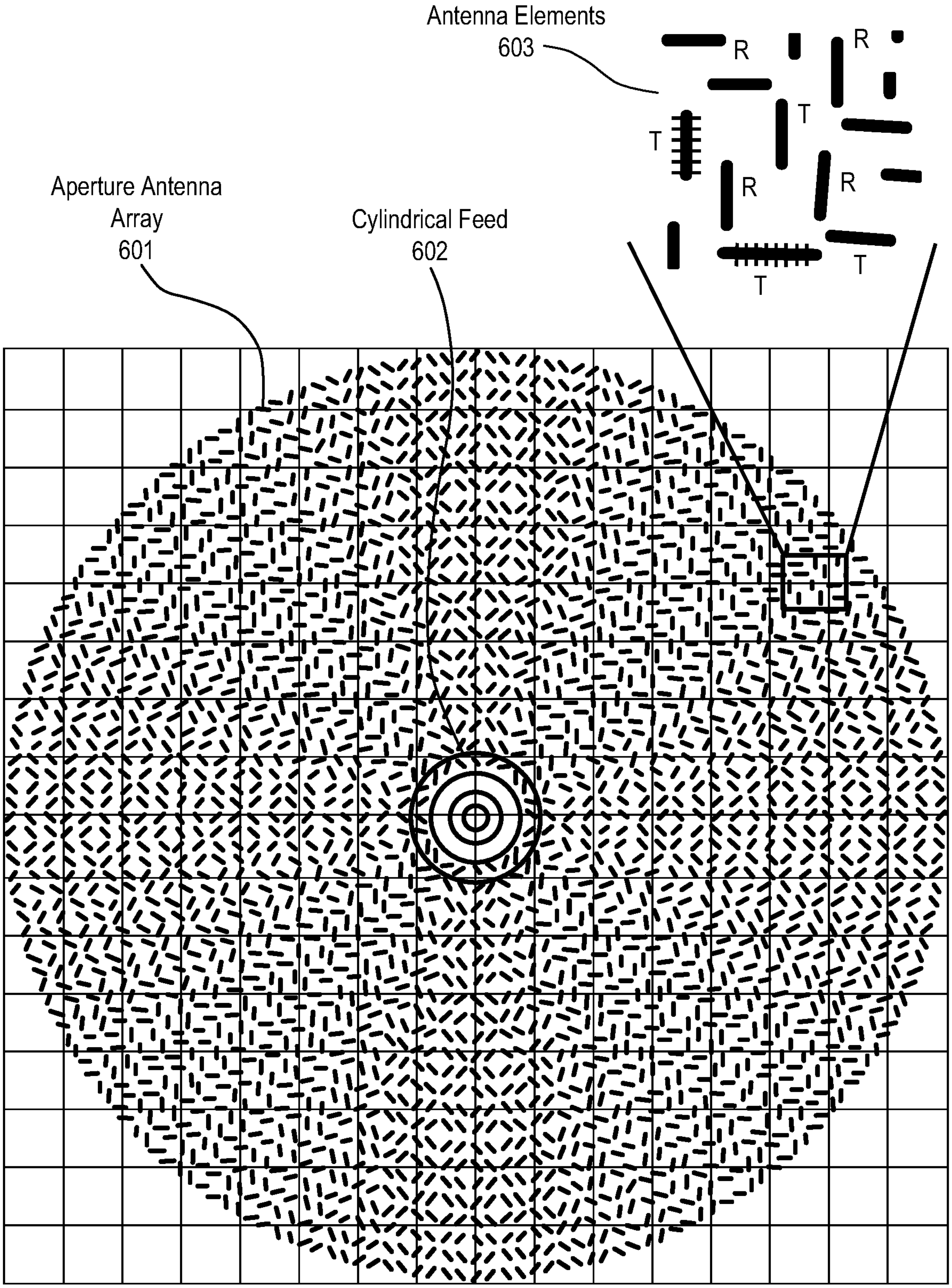
FIG. 6 illustrates the schematic of one embodiment of a cylindrically fed holographic radial aperture antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Such Rx and Tx irises, or slots, may be in groups of three or more sets where each set is for a separately and simultaneously controlled band. Examples of such antenna elements with irises are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure (of surface scattering antenna elements such as described herein), while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
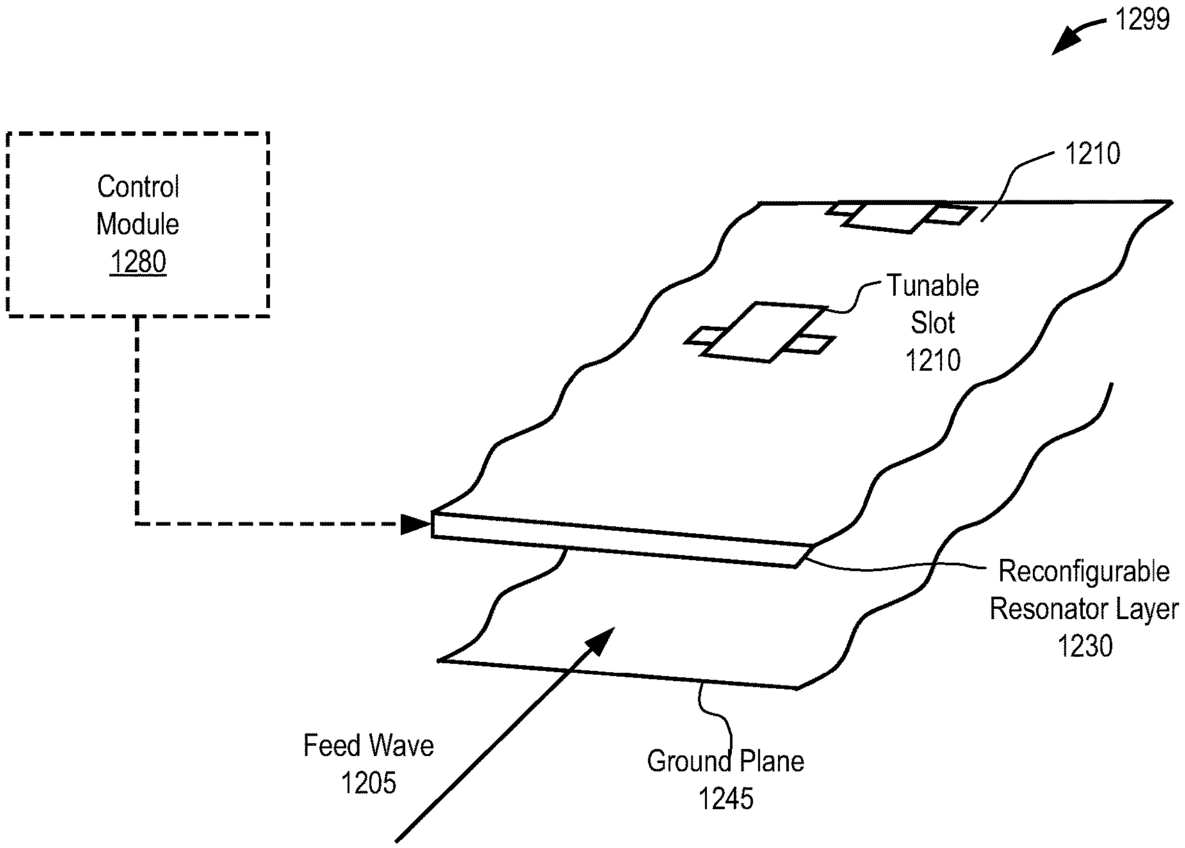
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
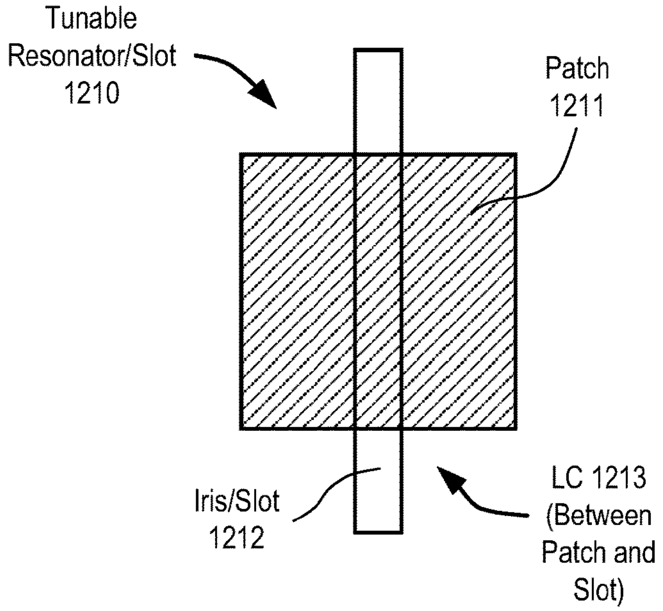
FIG. 8A illustrates one embodiment of a tunable resonator/slot.

Control module, or controller, 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}{}^{*}w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
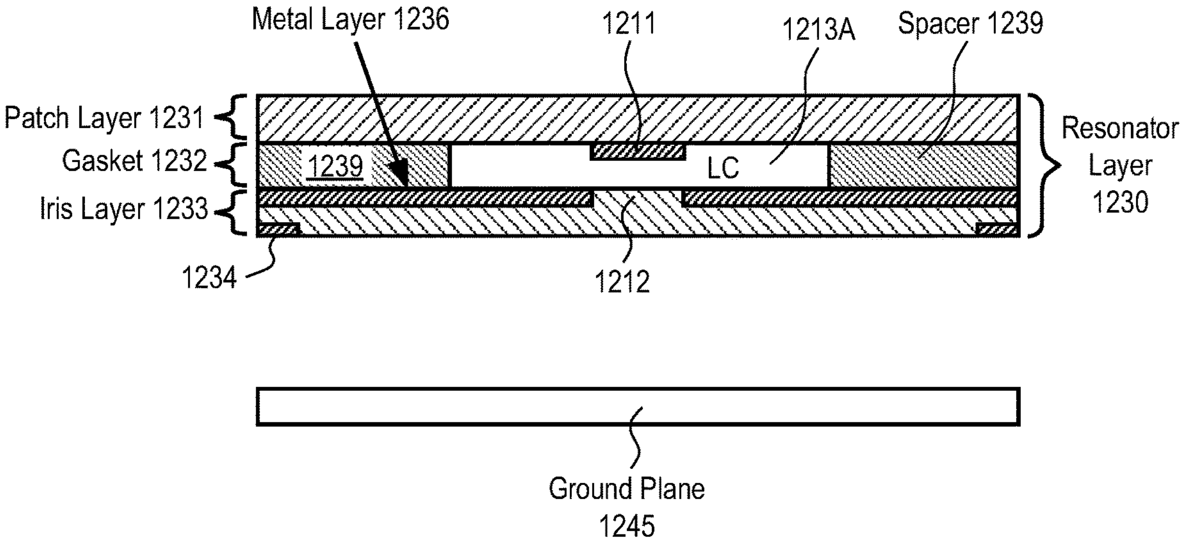
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 8A, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by λ/5. Other spacings may be used. In one embodiment, each tunable slot in a row is spaced from the closest tunable slot in an adjacent row by λ/2, and, thus, commonly oriented tunable slots in different rows are spaced by λ/4, though other spacings are possible (e.g., λ/5, λ/6.3). In another embodiment, each tunable slot in a row is spaced from the closest tunable slot in an adjacent row by λ/3.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 1A. Note that in this example the antenna array has two different types of antenna elements that are used for two different types of frequency bands.

Figure 9A:
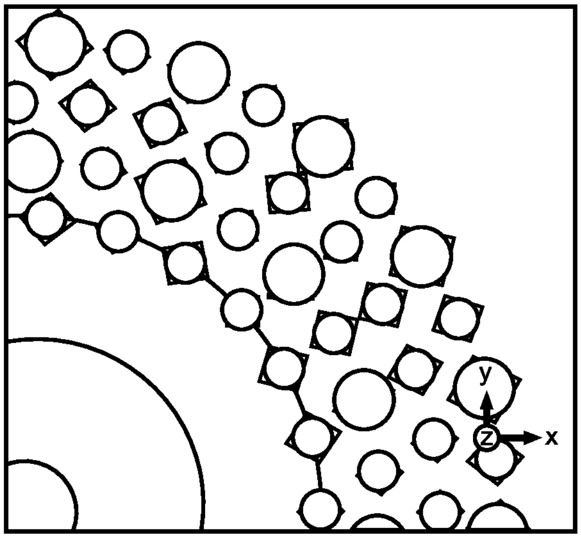
FIGS. 9A-D illustrate one embodiment of the different layers for creating the slotted array.
Figure 9B:
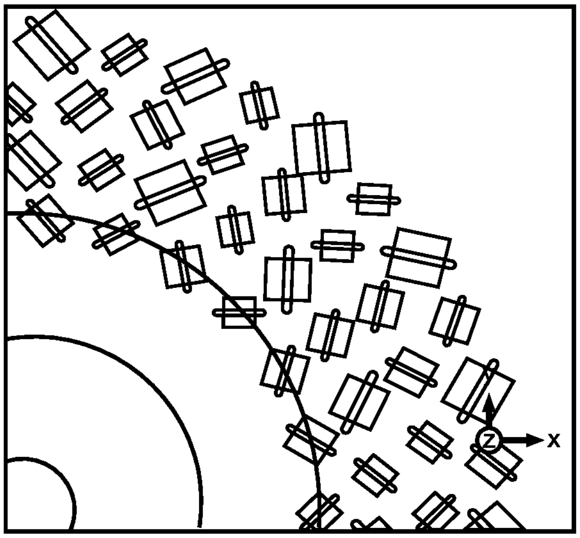
Figure 9C:
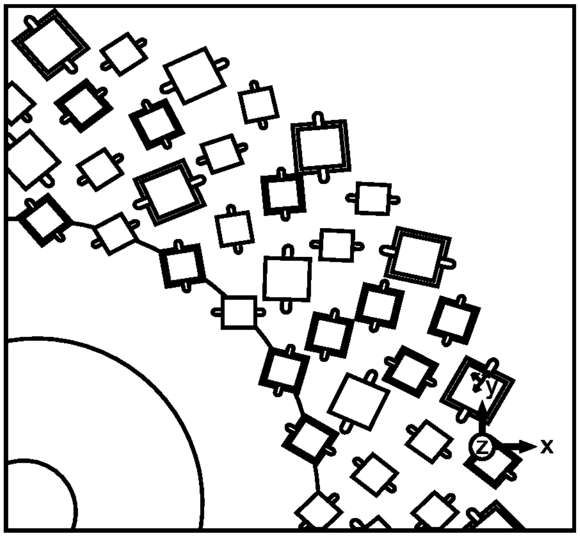
Figure 9D:
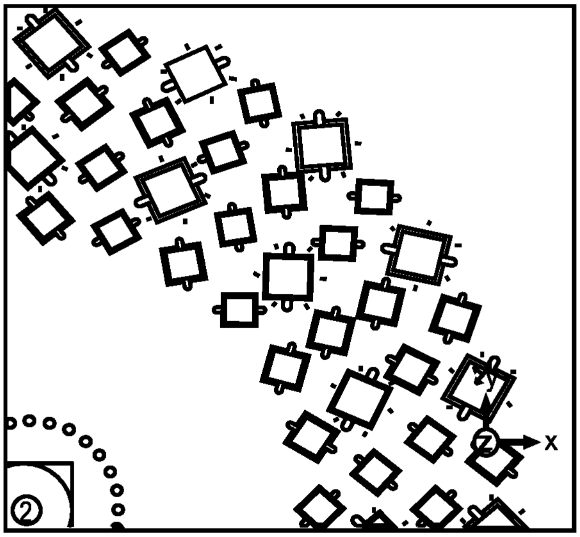

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
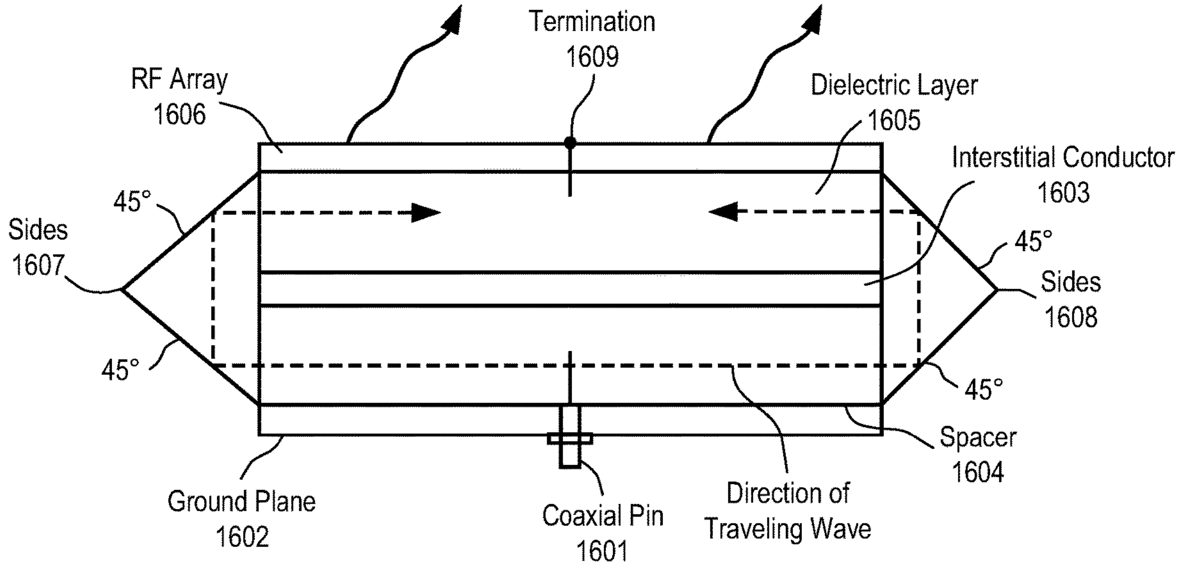
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be λ/2, where λ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
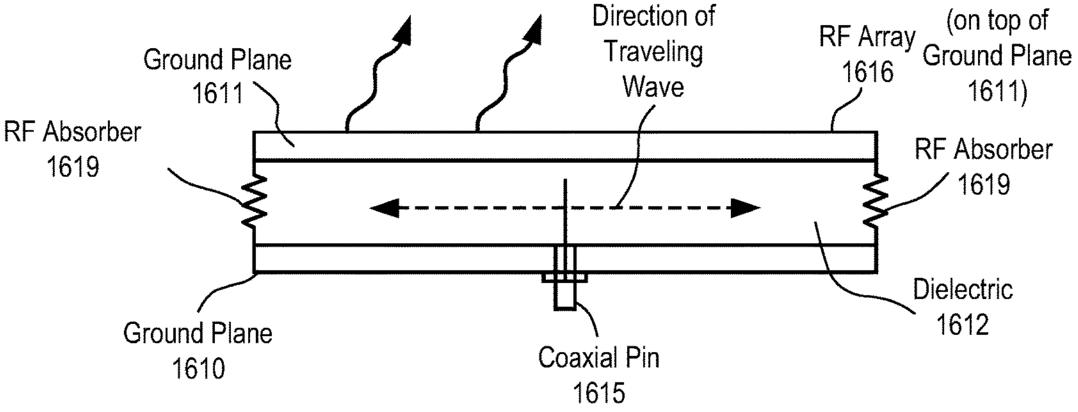
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
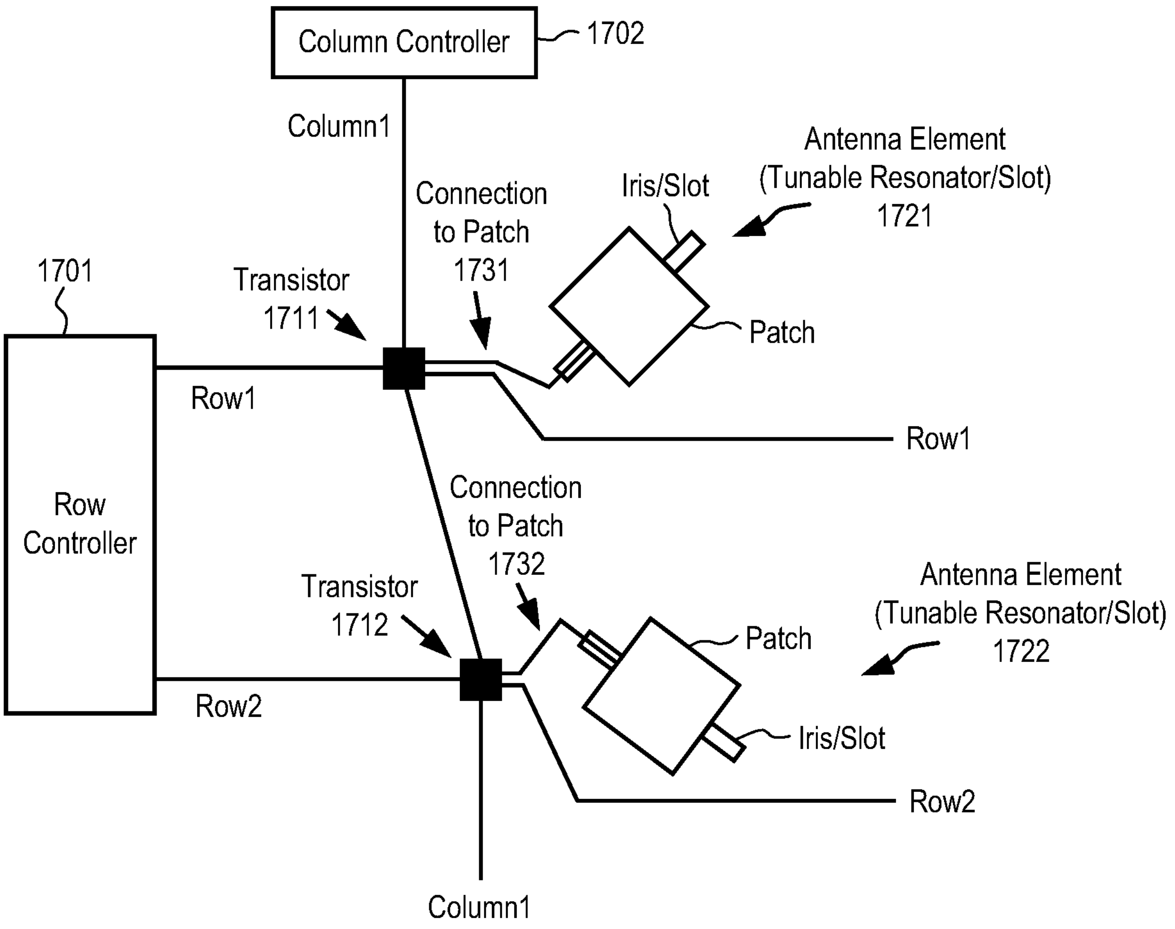
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
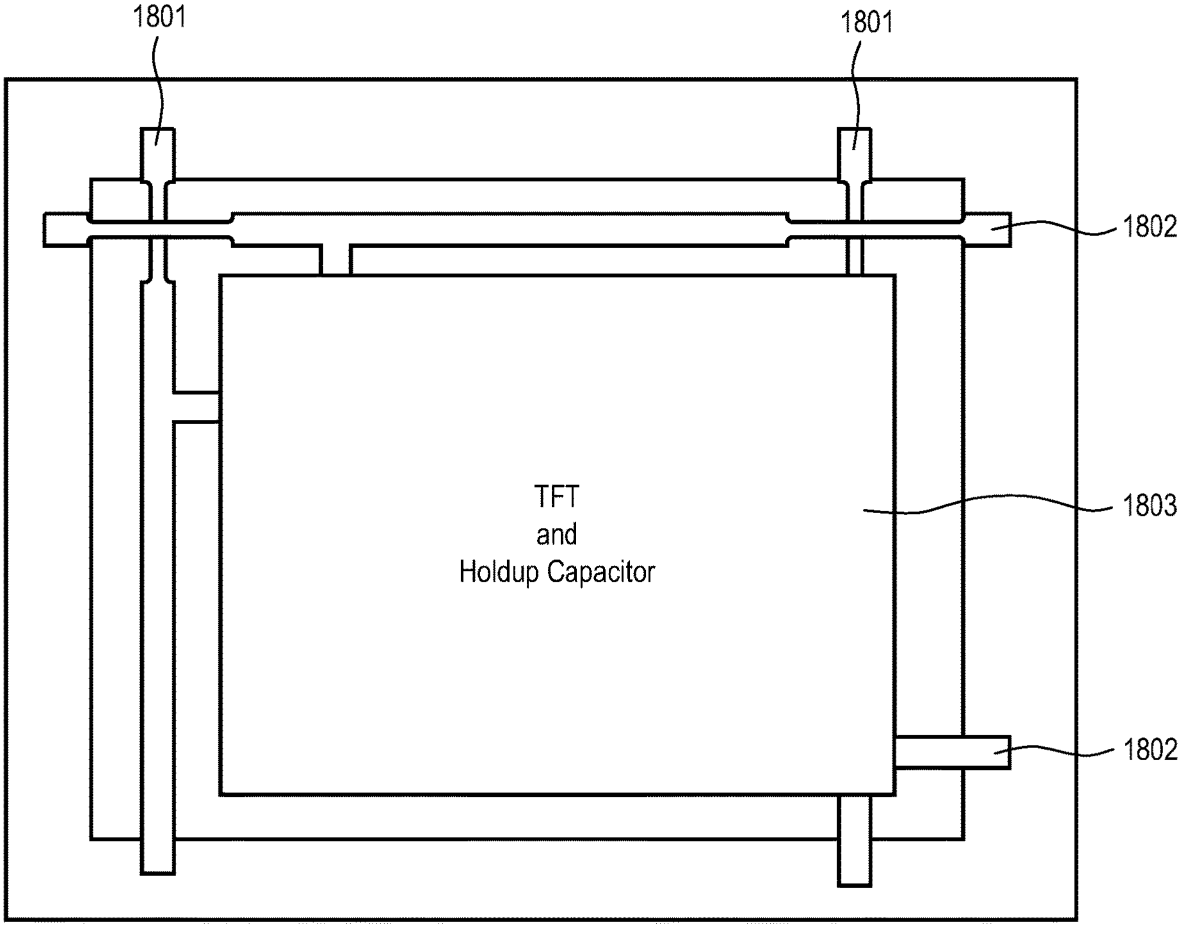
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
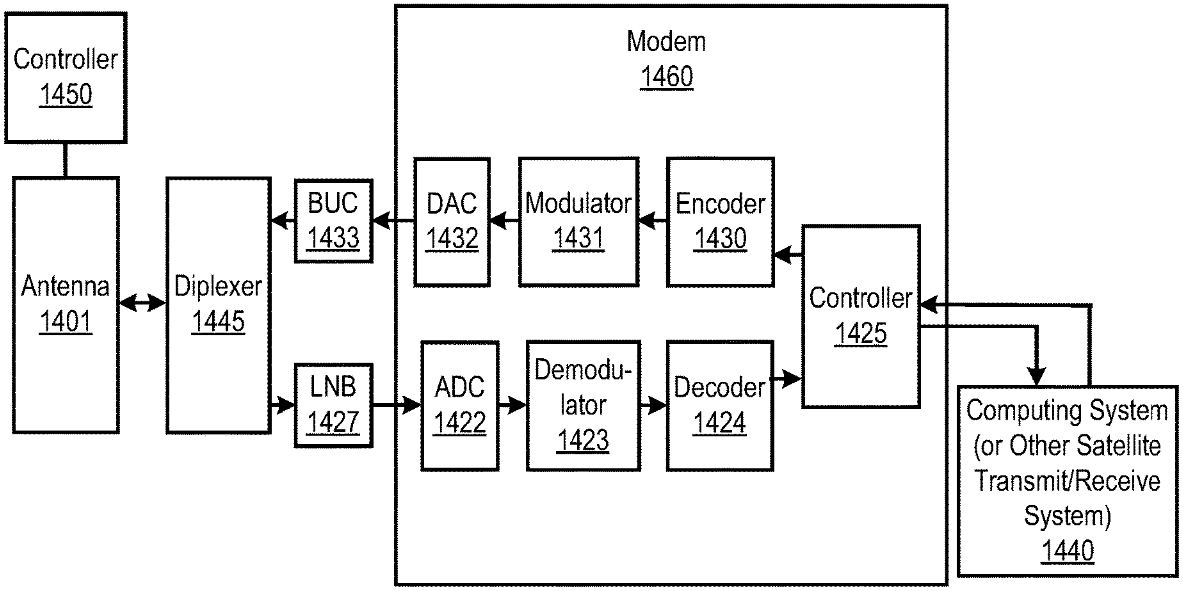
FIG. 14 is a block diagram of one embodiment of a communication system having simultaneous transmit and receive paths.

In another embodiment, the combined antenna apertures are used in a full duplex communication system. FIG. 14 is a block diagram of an embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, internet communication, vehicle communication (including software updating), etc.

There is a number of example embodiments described herein.

Example 1 is an antenna comprising an aperture having a plurality of radio-frequency (RF) radiating antenna elements, the plurality of RF radiating antenna elements being grouped into three or more sets of RF radiating antenna elements, with each set being separately controlled to generate a beam at a frequency band in a first mode.

Example 2 is the antenna of example 1 that may optionally include that each set of antenna elements has a plurality of tuning states and tuning states for at least two of the three or more sets of antenna elements are combined together to form a single beam in a second mode, the second mode being different from the first mode.

Example 3 is the antenna of example 2 that may optionally include that each of the at least two sets of antenna elements has different resonator settings that are tuned separately from other sets in the three of more sets.

Example 4 is the antenna of example 1 that may optionally include that at least two beams are generated simultaneously.

Example 5 is the antenna of example 1 that may optionally include that three or more sets of elements share or split a band.

Example 6 is the antenna of example 1 that may optionally include that the band comprises the Ku band with transmit and receive sub-bands.

Example 7 is the antenna of example 1 that may optionally include that each of the plurality of RF radiating antenna elements comprises tunable liquid crystal (LC) material for controlling said each RF radiating antenna element.

Example 8 is the antenna of example 1 that may optionally include that the three or more sets of RF radiating antenna elements are interleaved with each other.

Example 9 is the antenna of example 1 that may optionally include that RF radiating antenna elements of the plurality of sets of RF radiating antenna elements are located together in groups in the aperture, with each group comprising one RF radiating antenna element from each of the sets of RF radiating antenna elements.

Example 10 is the antenna of example 9 that may optionally include that said each group comprises two RF radiating receive antenna elements for use with receiving on receive sub-bands and one transmit RF radiating antenna element for use with transmission on a transmit sub-band, the transmit band being different than the two different receive bands.

Example 11 is the antenna of example 10 that may optionally include that the two receive sub-bands are operated separately and simultaneously to form two receive beams.

Example 12 is the antenna of example 10 that may optionally include that the groups of elements associated with the two receive bands are independently controlled and operated separately and each is combinable to operate with the transmit band, such that each combination is a duplex receive/transmit system.

Example 13 is the antenna of example 10 that may optionally include that, in each group, a first receive antenna element operating with a first receive sub-band is placed between a transmit antenna element and a second receive antenna element operating with a second receive sub-band, the first receive sub-band having a lower frequency than the second receive sub-band.

Example 14 is the antenna of example 10 that may optionally include that, in each group, a transmit antenna element is between a first receive antenna element operating with a first receive sub-band and a second receive antenna element operating with and a second receive sub-band.

Example 15 is the antenna of example 10 that may optionally include that, in each group, a first receive antenna element operating with a first receive sub-band is placed between a transmit antenna element and a second receive antenna element operating with a second receive sub-band, the first receive sub-band having a higher frequency than the second receive sub-band.

Example 16 is the antenna of example 10 that may optionally include that, in each group, a first receive antenna element operating with a first receive sub-band, a transmit antenna element and a second receive antenna element operating with a second receive sub-band are placed next to each other, with the transmit antenna element being shifted along a axis parallel to the first and second receive antenna elements and toward a center of the aperture.

Example 17 is the antenna of example 10 that may optionally include that, in each group, a first receive antenna element operating with a first receive sub-band, a transmit antenna element and a second receive antenna element operating with a second receive sub-band are placed next to each other, with the transmit antenna element being shifted along a axis parallel to the first and second receive antenna elements and outwardly with respect to a center of the aperture.

Example 18 is the antenna of example 9 that may optionally include that RF radiating antenna elements within each group and the groups of elements are placed to control mutual coupling.

Example 19 is an antenna comprising an aperture having a plurality of radio-frequency (RF) radiating antenna elements, the plurality of RF radiating antenna elements being grouped into three or more sets of RF radiating antenna elements, wherein each set of antenna elements has a plurality of tuning states and tuning states for at least two of the three or more sets of antenna elements are combined together to form a single beam in one mode.

Example 20 is the antenna of example 19 that may optionally include that the at least two sets of antenna elements comprises sets of receive elements with tuning states combined to form a single receive beam.

Example 21 is the antenna of example 19 that may optionally include that each of the at least two sets of antenna elements has different resonator settings that are tuned separately from other sets in the three or more sets.

Example 22 is the antenna of example 19 that may optionally include that at least two beams are generated simultaneously using the three or more sets of RF radiating antenna elements.

Example 23 is the antenna of example 19 that may optionally include that the three or more sets of RF radiating antenna elements are interleaved with each other.

Example 24 is the antenna of example 19 that may optionally include that RF radiating antenna elements of the plurality of sets of RF radiating antenna elements are located together in groups in the aperture, with each group comprising one RF radiating antenna element from each of the sets of RF radiating antenna elements.

Example 25 is the antenna of example 24 that may optionally include that, in each group, a first receive antenna element operating with a first receive sub-band is placed between a transmit antenna element and a second receive antenna element operating with a second receive sub-band, the first receive sub-band having a lower frequency than the second receive sub-band.

Example 26 is the antenna of example 24 that may optionally include that, in each group, a transmit antenna element is between a first receive antenna element operating with a first receive sub-band and a second receive antenna element operating with a second receive sub-band.

Example 27 is the antenna of example 24 that may optionally include that, in each group, a first receive antenna element operating with a first receive sub-band is placed between a transmit antenna element and a second receive antenna element operating with a second receive sub-band, the first receive sub-band having a higher frequency than the second receive sub-band.

Example 28 is an antenna comprising an aperture having a plurality of radio-frequency (RF) radiating antenna elements, the plurality of RF radiating antenna elements of varying sizes controlled independently using LC tuning components to generate beams in three or more frequency bands.

Example 29 is the antenna of example 28 that may optionally include that the plurality of radio-frequency (RF) radiating antenna elements comprise a plurality of electronically-steerable flat panel antennas having at least three spatially interleaved antenna sub-arrays combined in the aperture, the plurality of electronically-steerable flat panel antennas to operate independently and simultaneously at distinct frequencies, wherein each of the at least three antenna sub-arrays comprises a tunable slotted array of antenna elements.

Example 30 is the antenna of example 29 that may optionally include that the at least three spatially interleaved antenna sub-arrays comprises at least one of the transmit sub-array and at least two receive sub-arrays.

Example 31 is the antenna of example 30 that may optionally include that RF radiating antenna elements of each of the at least one of the transmit sub-array and at least two receive sub-arrays have different physical sizes in comparison to each other.

Example 32 is the antenna of example 28 that may optionally include that the plurality of RF radiating antenna comprises a plurality of sets of RF radiating antenna elements are located together in groups in the aperture, with each group comprising one RF radiating antenna element from each of the sets of RF radiating antenna elements.

Example 34 is the antenna of example 28 that may optionally include that each set of antenna elements has a plurality of tuning states and tuning states for at least two of the three or more sets of antenna elements are combined together to form a single beam in one mode.

Example 34 is the antenna of example 33 that may optionally include that the at least two sets of antenna elements comprises sets of receive elements with tuning states combined to form a single receive beam.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An antenna comprising:

an aperture having a plurality of radio-frequency (RF) radiating antenna elements, the plurality of RF radiating antenna elements including three or more sets of RF radiating antenna elements, with a RF radiating antenna element from each set of the three or more sets of RF radiating antenna elements being located in the aperture as a distinct group, wherein two sets of RF radiating antenna elements of the three or more sets of RF radiating antenna elements are controllable to operate in a single band mode in which two of the three or more sets of RF radiating antenna elements are used in a combined fashion to cover a same operation frequency or to cover a wider tuning range in a multiband mode than a tuning range in the single band mode.

2. The antenna of claim 1 wherein the two sets of RF radiating antenna elements are two sets of receive RF radiating antenna elements.

3. The antenna of claim 2 wherein size of RF radiating antenna elements in a first set of the two sets is larger than the size of the RF radiating antenna elements in a second set of the two sets.

4. The antenna of claim 3 wherein RF radiating antenna elements of the first set are wider than RF radiating antenna elements of the second set.

5. The antenna of claim 2 wherein the two sets of receive RF radiating antenna elements are operable to generate a single beam in the single band mode and two beams in multiband mode.

6. The antenna of claim 1 wherein the two sets of RF radiating antenna elements are two sets of receive antenna elements configured to be used together to form a single receive beam or two receive beams in different modes.

7. The antenna of claim 6 wherein available resonant tuning states from the two sets of elements are configured to be combined together to form the single receive beam.

8. The antenna of claim 6 wherein the two sets of RF radiating antenna elements are operable to form two receive beams with a first beam of the two receive beams to point towards a first satellite while a second receive beam of the two receive beams to point towards a second satellite.

9. The antenna of claim 8 wherein the two sets are operable to form the first beam towards the first satellite as a next emerging satellite, the second beam subsequently terminating, a satellite connection to the second satellite is being lost as part of make-before-break situation.

10. The antenna of claim 1 wherein the two sets of RF radiating antenna elements are separately controllable.

11. The antenna of claim 1 further comprising an antenna controller to independently control the two sets to produce two receive beams in a third mode and at least one set of RF radiating transmit antenna elements configured to produce a transmit beam.

12. The antenna of claim 11 wherein the antenna controller is configured to communicate beam point information that specifies in which directions the two receive beams and the transmit beam are to point, the beam point information configured to control a receive modulations for first and second sets of receive antenna elements and a transmit modulation for the set of transmit antenna elements, the receive modulations forming the two beams configured to point in different directions.

13. The antenna defined in claim 1 wherein RF radiating antenna elements of each distinct group are parallel with each other.

14. The antenna defined in claim 11 wherein RF radiating antenna elements of each distinct group are placed with respect to each other to limit mutual coupling.

15. The antenna defined in claim 1 wherein RF radiating antenna elements of the plurality of sets of RF radiating antenna elements are located together in groups in the aperture, with each group comprising one RF radiating antenna element from each of the sets of RF radiating antenna elements.

16. The antenna defined in claim 15 where said each group comprises two RF radiating receive antenna elements for use with receiving on receive bands and one transmit RF radiating antenna element for use with transmission on a transmit band, the transmit band being different than the two different receive bands.

17. The antenna defined in claim 16 wherein, in each group, a first receive antenna element operating with a first receive sub-band is placed between a transmit antenna element and a second receive antenna element operating with a second receive sub-band, the first receive sub-band having a lower frequency than the second receive sub-band.

18. The antenna defined in claim 16 wherein, in each group, a transmit antenna element is between a first receive antenna element operating with a first receive sub-band and a second receive antenna element operating with and a second receive sub-band.

19. The antenna defined in claim 16 wherein, in each group, a first receive antenna element operating with a first receive sub-band is placed between a transmit antenna element and a second receive antenna element operating with a second receive sub-band, the first receive sub-band having a higher frequency than the second receive sub-band.

20. An antenna comprising:

an aperture having a plurality of radio-frequency (RF) radiating antenna elements, the plurality of RF radiating antenna elements including three or more sets of RF radiating antenna elements, with a RF radiating antenna element from each set of the three or more sets of RF radiating antenna elements being located in the aperture as a distinct group, wherein two sets of RF radiating antenna elements of the three or more sets of RF radiating antenna elements are controllable to operate in a single band mode in which two of the three or more sets of RF radiating antenna elements are used in a combined fashion to cover a first bandwidth or to cover a second bandwidth in a multiband mode that is larger than the first bandwidth in the single band mode.

* * * * *